United States Patent [19]

Smith

[11] Patent Number: 4,763,439
[45] Date of Patent: Aug. 16, 1988

[54] ANIMAL TRAP

[75] Inventor: James Smith, 330 Bay Street, Thunder Bay, Ontario, Canada

[73] Assignees: James Smith; Joseph Eugene Belisle, both of Canada

[21] Appl. No.: 876,005

[22] Filed: Jun. 19, 1986

[30] Foreign Application Priority Data

Jun. 24, 1985 [CA] Canada .................................. 484936

[51] Int. Cl.⁴ ........................................... A01M 23/16
[52] U.S. Cl. .................................................... 43/61
[58] Field of Search ...................... 43/58, 61, 62, 124, 43/125, 131

[56] References Cited

U.S. PATENT DOCUMENTS

| | | | |
|---|---|---|---|
| 2,087,646 | 7/1937 | Houghton | 43/61 |
| 2,188,652 | 1/1940 | Cress | 43/61 |
| 2,229,685 | 12/1939 | Swedenburg | 43/61 |
| 2,412,518 | 12/1946 | Krelwitz | 43/61 |
| 2,518,819 | 8/1950 | Roessler, Jr. | 43/61 |
| 2,573,228 | 10/1951 | Slauth | 43/61 |
| 3,426,470 | 2/1969 | Rudolph | 43/61 |
| 3,823,504 | 7/1974 | Dosch | 43/61 |
| 3,975,857 | 8/1976 | Branson | 43/61 |
| 4,080,749 | 3/1978 | Gilbaugh | 43/61 |
| 4,144,667 | 3/1979 | Souza | 43/61 |
| 4,179,835 | 12/1979 | Hunter | 43/61 |
| 4,310,984 | 1/1982 | Brubaker, Jr. | 43/61 |
| 4,318,241 | 3/1982 | Fassauer | 43/58 |
| 4,583,317 | 4/1986 | Beard | 43/61 |

FOREIGN PATENT DOCUMENTS

| | | | |
|---|---|---|---|
| 294664 | 11/1929 | Canada . | |
| 770355 | 10/1967 | Canada | 43/65 |
| 1163095 | 3/1984 | Canada | 43/103 |
| 1099927 | 6/1984 | U.S.S.R. | 43/58 |

Primary Examiner—Kurt Rowan
Attorney, Agent, or Firm—Stevens, Davis, Miller & Mosher

[57] ABSTRACT

An animal trap is disclosed comprising an elongate, preferably air impermeable housing at one end of which is disposed a bait hook operatively associated with a trigger mechanism releasing a gate at the other end of the housing, to close same. Simultaneously with the closing, the interior of the housing is filled with an anesthetic. Thus, the animal trapped inside expires in its sleep without suffering.

3 Claims, 1 Drawing Sheet

ANIMAL TRAP

BACKGROUND OF THE INVENTION

The present invention relates to animal traps and in particular to animal traps of the type comprising a box or housing into which the animal to be trapped is lured, whereupon a trigger mechanism activated by the animal from the inside of the housing releases a door or gate to be closed.

The traps of this kind are known from prior art. Reference may be had, for instance, to U.S. Pat. No. 2,188,652 issued to N. Cress Jan. 30, 1940. Another device of this type is disclosed in U.S. Pat. No. 2,229,685 issued to G. F. Swedenburg Jan. 28, 1941. Still further device of this kind is shown in U.S. Pat. No. 2,573,228 issued to J. M. Slauth Oct. 30, 1951, U.S. Pat. No. 4,144,667 issued to A. J. Souza Mar. 20, 1979 and U.S. Pat. No. 4,310,984 issued to F. A. Brubaker Jr. Jan. 19, 1982.

The above prior art references show that the kind of trap having a housing into which the animal is lured and which is then closed has been known and used for a considerable length of time.

One of the disadvantages of the known traps of this kind is seen in that the animal trapped inside the housing is often left to expire after a prolonged time of suffering, often due to lack of food or lack of water or the combination of the two.

Attempts have been made to reduce the suffering of the trapped animal by providing means for introduction of an anesthetizing fluid such as chloroform into an enclosed trap. U.S. Pat. No. 2,518,819, issued to A. B. Roessler Jr. Aug. 15, 1950, discloses a box-shaped trap with a flap to which is secured a capsule of a lethal material. The animal trapped inside must attack the flap in an effort to free itself and in the process to puncture the capsule to release its contents. While this arrangement may be more humane than the traps mentioned above, the suffering of the trapped animal is still substantial. U.S. Pat. No. 3,823,504, issued to M. L. Dosch July 16, 1974, shows another trap having a housing provided with a valve which permits a user to introduce a predetermined amount of an anesthetizing fluid into the housing. Here, again, the trapped animal may be left in the trap for a considerable time before the user arrives to administer the lethal substance.

It is an object of the present invention to provide an improvement in the traps of the type of the last two references whereby the suffering of the trapped animal would be still further reduced and preferably completely eliminated.

SUMMARY OF THE INVENTION

In general terms, the present invention provides an animal trap comprising, in combination: a housing adapted to receive within the interior thereof an animal to be trapped; closure means at an entrance to the housing, spring means adapted to resiliently urge the closure means to a closed position at which the closure means is operative in preventing the trapped animal from escaping from said housing; closure trigger means operatively associated with a section of the interior of said housing to release said closure from a cocked, open position to thus allow said spring means to bring the closure to the closed position; an anesthetic release device operatively associated with said housing and with said closure means to expose the interior of the housing to anesthetic generally simultaneously with the closing the said closure means.

In a particularly preferred embodiment, the closure means is a swing-gate hingedly secured to the housing at said entrance opening gate, said housing being provided at the interior thereof with a recess at said entrance, the recess being adapted to receive a breakable container of an anesthetic, the recess being so arranged and dimensioned that the respective container disposed therein becomes broken by said stem as the gate is slammed closed by said coil spring.

The invention will be described by way of a preferred embodiment with reference to the accompanying drawing wherein:

BRIEF DESCRITION OF THE FIGURES

FIG. 1 is a perspective view of the preferred embodiment of the trap according to the present invention; and FIG. 2 is a simplified longitudinal section thereof.

DETAILED DESCRIPTION

Figure 1:
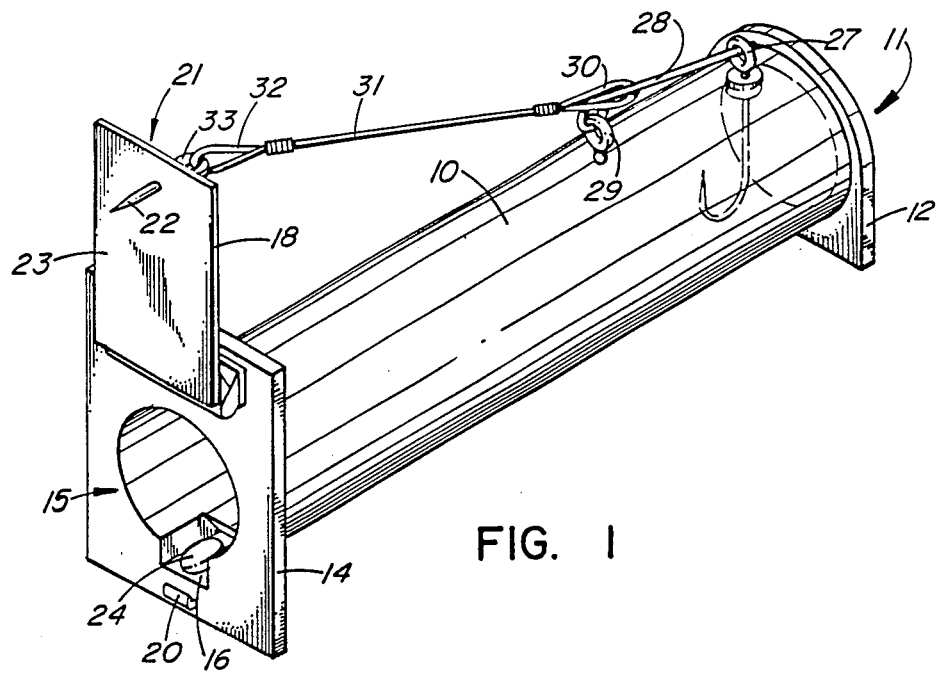

Reference numeral 10 denotes a tubular sleeve-like housing. In the shown embodiment, the housing is made of plexiglass (a trade mark). It is air impermeable and transparent. The housing can also be made from a different material, e.g. from spinmoulded plastic, fiberglass or metal.

Figure 2:
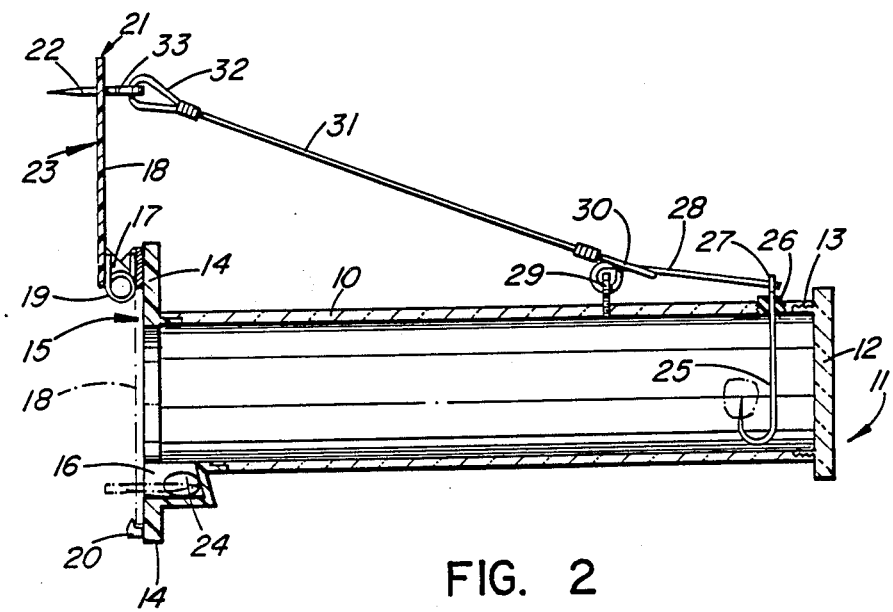

The tubular housing 10 is enclosed at its one end 11 by an air impermeable rear end wall 12. The end wall 12 is threaded into an inner thread in the housing 10, as best seen in FIG. 2. The threaded portion connecting the housing 10 and the end wall 12 is referred to with reference numeral 13.

The opposite end of the housing 10 is provided with an air impermeable front wall 14 adhesively secured to the housing 10. The front wall 14 has a generally planar front face 15 and a generally rectangular recess 16.

A hinge 17 secures to the front wall 14 a swing gate 18. A heavy spring 19 urges the gate 18 to a closed position shown in broken lines of FIG. 2. A resiliently releasable locking foot 20 is hook-shaped in cross-sectional configuration (see FIG. 2) and is adapted to lockingly receive the free end 21 of the gate 18.

A stem 22 protrudes from a normally inner surface 23 of the gate 18. As shown by the broken lines in FIG. 2, the stem 22 reaches into the recess 16 when the gate 18 is closed. If a breakable ether pellet 24 is placed in the recess 16, the pin or stem 22 breaks up the pellet thus releasing ether contained therein into the interior of the housing 10. Since the gate 18 and the end wall 12 are both made of air impermeable material and the gate 18 engages the front face 15 of the front wall 14 in a generally air-tight fashion, the animal trapped inside the housing is soon put to sleep by the ether and eventually expires, virtually without suffering any pain.

The full lines of FIGS. 1 and 2 show the gate 18 in an open state at which the trigger mechanism utilized in the shown trap is cocked. The trigger mechanism consists of a bait hook 25 resiliently mounted in the wall of the housing 10 by way of a rubber sleeve 26. The portion of the bait hook 25 disposed exteriorly of the housing 10 is designated with reference number 27. As best seen from FIG. 1, it has the shape of an eyelet which, in the cocked state, receives the free end of a straight rod 28. The flexible mount of the bait hook 25 in the sleeve 26 allows for transmission of any movement of the bait hook caused by the trapped animal to the eyelet 27 with the result that the free end of the rod 28 becomes released from engagement with the eyelet 27. The rod 28 is pivotally secured to the housing 10 at an eyelet 29 and is threaded through a loop 30 of a flexible cable 31 whose opposite end is secured to the free end 21 of gate 18 at a forward loop 32 engaged in an eyelet 33 fixedly secured to the gate 18 and preferably integral with the stem 22. The whole trigger mechanism comprised of the trigger element 25, the eyelet or latch element 27, the trigger lever or rod 28 at the cable 31 is maintained in a cocked state by the force exerted by the heavy spring 19 onto the gate 18. In practice, the free end of the trigger lever or rod 28 becomes released from the eyelet 27 (also referred to as a "latch element") on slightest movement of the bait hook 25. This results in an instant release of the rod 28 which now pivots about the eyelet 29 releasing the loop 30 of the cable 31 thus freeing the gate 18 to be shut by the heavy spring 19 into a closed position (broken lines of FIG. 2) while simultaneously penetrating the pellet 24 to release the ether charge contained therein into the interior of the housing 10.

The trigger mechanism described above is merely a preferred embodiment thereof. Other known types of trigger mechanism or even of the gate mechanism itself can be employed. It is also believed that the use of the pellets of ether is the most convenient way of application of the present invention. Again, the use of another anesthetic is possible within the scope of the present invention.

Thus, it will be appreciated that the disclosed embodiment may be modified without departing from the scope of the present invention as set forth in the accompanying claims.

I claim:
1. An animal trap comprising, in combination:
   (a) a housing made from air impermeable material and adapted to receive within the interior thereof an animal to be trapped;
   (b) a swing-gate closure means hinged at the entrance to the housing, said closure means being made of air impermeable material and being adapted to close said entrance opening in a generally air-tight fashion;
   (c) spring means adapted to resiliently urge the closure means to a closed position at which the closure means is operative in preventing the trapped animal from escaping from said housing;
   (d) closure trigger means operatively associated with a section of the interior or said housing to release said closure from a cocked, open position to thus allow said spring means to bring the closure to the closed position to close the housing in an air-tight fashion;
   (e) an anesthetic release device operatively associated with said housing and with said closure means to expose the said interior of the housing to anesthetic virtually simultaneously with the closing of said closure means comprising a protrusion member fixedly secured to and protruding from a normally inner surface of said gate to a free end portion of the gate, said member being adapted to enter, upon closing of the gate, an anesthetic holder means fixedly arranged with respect to the housing, so as to break, on slamming the gate shut, an anesthetic containing pellet disposed in said holder means.

2. Animal trap as claimed in claim 1, wherein said housing is of an elongate, generally tubular configuration having a first end generally coincident with said entrance, and a second end provided with a flexibly mounted trigger element which forms a part of said trigger means, said trigger element being a bait holder flexibly secured to a wall section of said housing and having an exterior portion and a bait holding portion integral with said exterior portion and disposed interiorly of said housing, whereby a movement of the baid holding portion is directly transmitted to the said exterior portion.

3. An animal trap comprising, in combination:
   (a) a housing having an entrance opening and adapted to receive within the interior thereof an animal to be trapped;
   (b) a swing-gate hingedly secured to the housing at said entrance opening for pivoting in a hinge having axis generally parallel with a plane of coincidence with said opening;
   (c) a coil spring generally coaxial with the axis of the hinge and adapted to resiliently urge the gate to a closed position at which the gate is operative in preventing the trapped animal from escaping from said housing;
   (d) closure trigger means operatively associated with a section of the interior of said housing to release said gate from a cocked, open position to thus allow said coil spring to bring the gate to the closed position;
   (e) an anesthetic release device includes a stem protruding from a normally inner surface of said gate at a free end portion of the gate;
   (f) said housing being provided at the interior thereof with a recess at said entrance, the recess being adapted to receive a breakable container of an anesthetic, said recess being so arranged and dimensioned that the respective container disposed therein becomes broken by said stem as the gate is slammed closed by said coil spring.

* * * * *